US012688129B1

(12) United States Patent
    Rausch

(10) Patent No.: US 12,688,129 B1
(45) Date of Patent: Jul. 21, 2026

(54) VOLATILE KEY STORAGE FOR DATA ENCRYPTION

(71) Applicant: Amazon Technologies, Inc., Seattle, WA (US)

(72) Inventor: Tim Rausch, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 750 days.

(21) Appl. No.: 18/066,219

(22) Filed: Dec. 14, 2022

(51) Int. Cl.
    *G06F 12/14* (2006.01)
    *G06F 21/62* (2013.01)

(52) U.S. Cl.
    CPC .......... *G06F 12/1408* (2013.01); *G06F 21/62* (2013.01)

(58) Field of Classification Search
    CPC ......... G06F 12/1408; G06F 21/62; H04L 9/00
    See application file for complete search history.

(56) References Cited

U.S. PATENT DOCUMENTS

| | | | | |
|---|---|---|---|---|
| 7,953,987 B2 * | 5/2011 | Buscaglia | .............. | G06F 21/86 |
| | | | | 713/192 |
| 10,855,451 B1 * | 12/2020 | Allo | ...................... | H04L 9/3263 |
| 2011/0153798 A1 * | 6/2011 | Groenendaal | .......... | H04L 63/20 |
| | | | | 713/153 |
| 2017/0230179 A1 * | 8/2017 | Mannan | ................ | H04L 9/3226 |

* cited by examiner

*Primary Examiner* — Frantz B Jean
(74) *Attorney, Agent, or Firm* — Klarquist Sparkman, LLP

(57) ABSTRACT

In a data storage system, stored data is secured using a key-based encryption algorithm. The disclosure provides mechanisms for increasing security of the stored data by storing a unique key used to encrypt and/or decrypt the data in a volatile key storage of a backplane, where power to the volatile key storage is routed through a connection that is closed when a corresponding data storage device is connected to the backplane and open when the corresponding data storage device is disconnected from the backplane.

20 Claims, 7 Drawing Sheets

Figure 2:
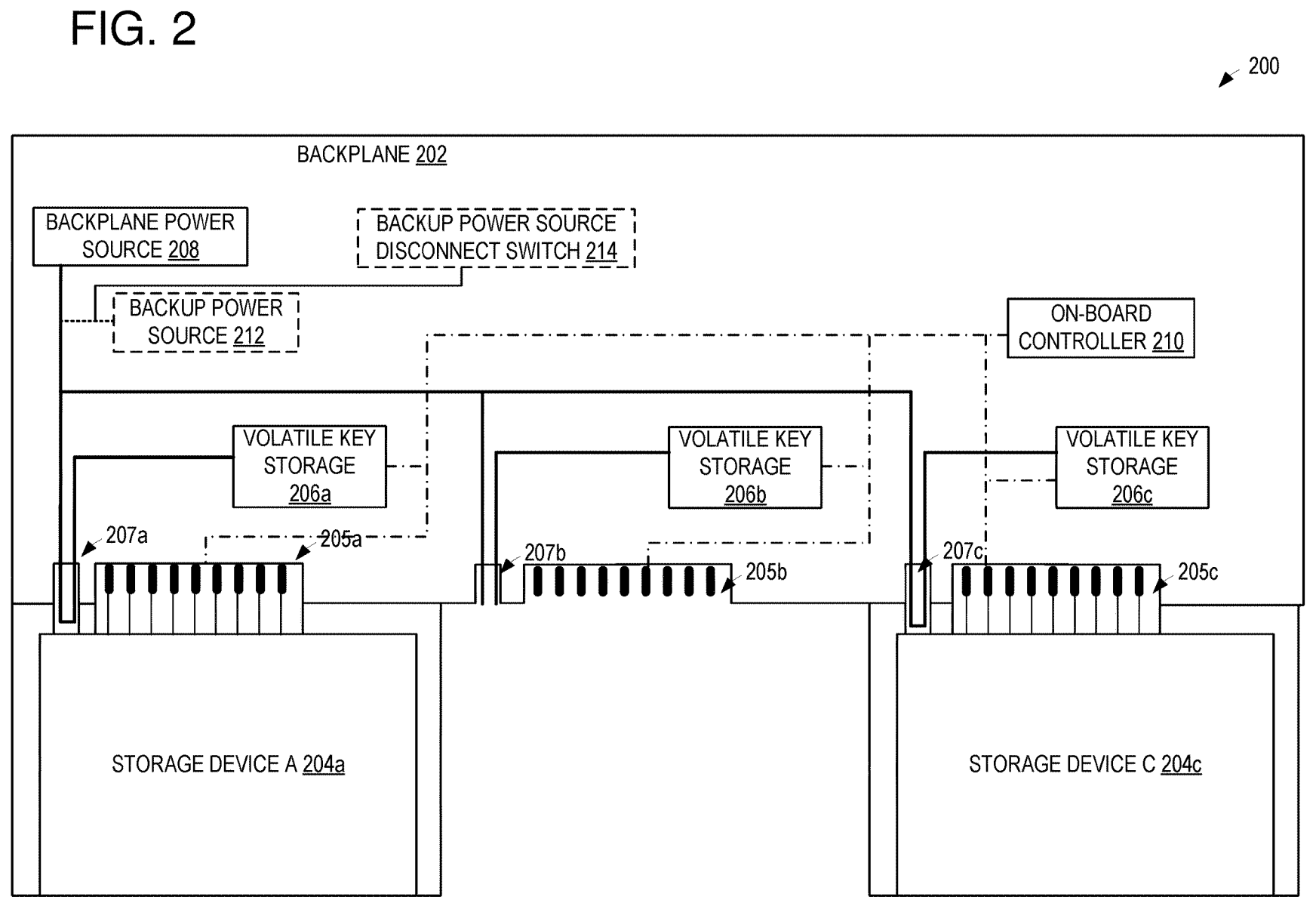

BACKPLANE 202

BACKPLANE POWER SOURCE 208

BACKUP POWER SOURCE 212

BACKUP POWER SOURCE DISCONNECT SWITCH 214

ON-BOARD CONTROLLER 210

VOLATILE KEY STORAGE 206a

VOLATILE KEY STORAGE 206b

VOLATILE KEY STORAGE 206c

205a

205b

205c

207a

207b

207c

STORAGE DEVICE A 204a

STORAGE DEVICE C 204c

Figure 3:
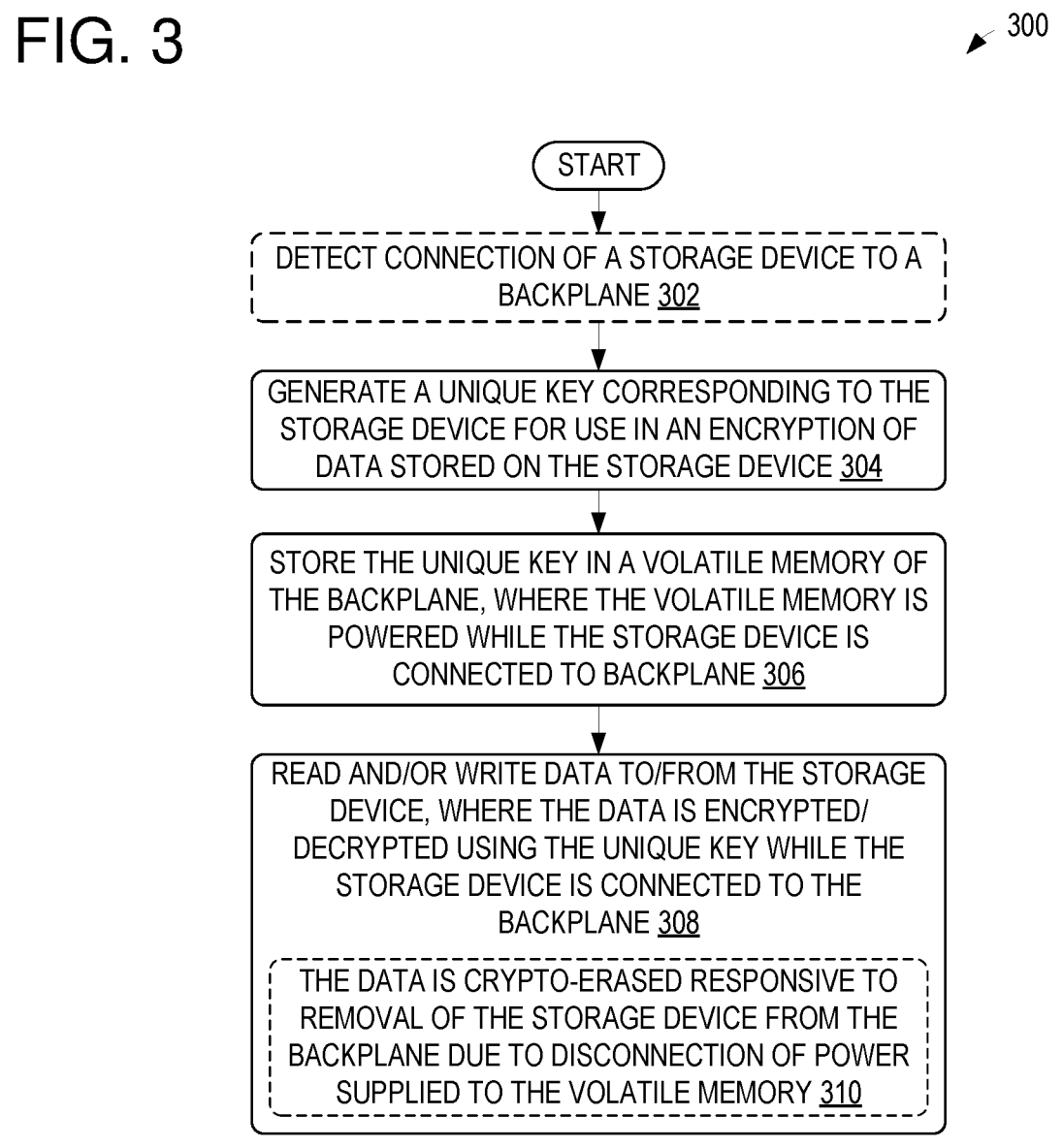

START

DETECT CONNECTION OF A STORAGE DEVICE TO A BACKPLANE 302

GENERATE A UNIQUE KEY CORRESPONDING TO THE STORAGE DEVICE FOR USE IN AN ENCRYPTION OF DATA STORED ON THE STORAGE DEVICE 304

STORE THE UNIQUE KEY IN A VOLATILE MEMORY OF THE BACKPLANE, WHERE THE VOLATILE MEMORY IS POWERED WHILE THE STORAGE DEVICE IS CONNECTED TO BACKPLANE 306

READ AND/OR WRITE DATA TO/FROM THE STORAGE DEVICE, WHERE THE DATA IS ENCRYPTED/ DECRYPTED USING THE UNIQUE KEY WHILE THE STORAGE DEVICE IS CONNECTED TO THE BACKPLANE 308

THE DATA IS CRYPTO-ERASED RESPONSIVE TO REMOVAL OF THE STORAGE DEVICE FROM THE BACKPLANE DUE TO DISCONNECTION OF POWER SUPPLIED TO THE VOLATILE MEMORY 310

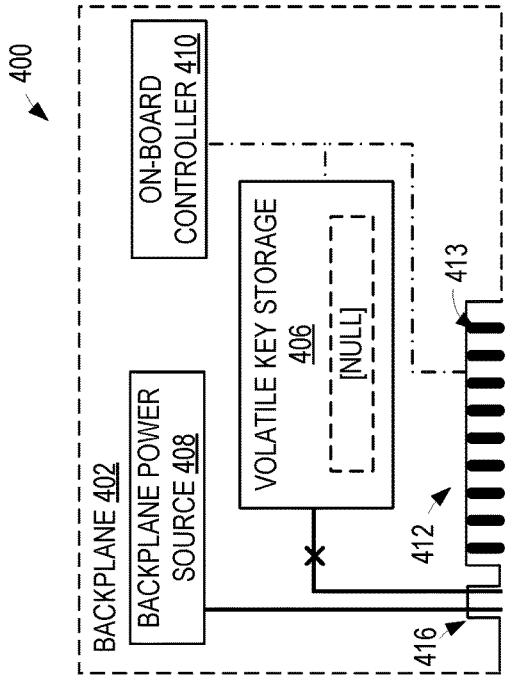
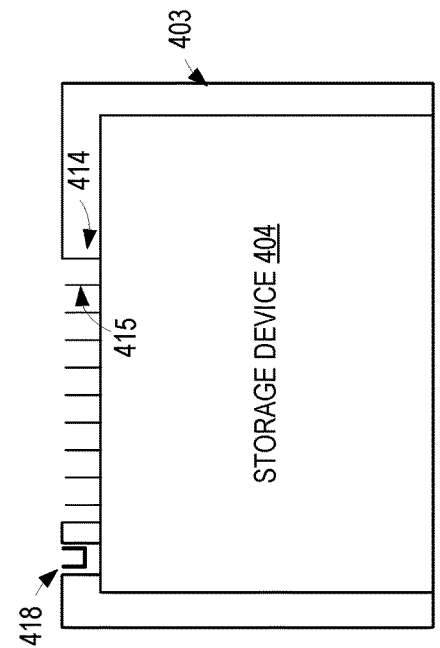
FIG. 4B
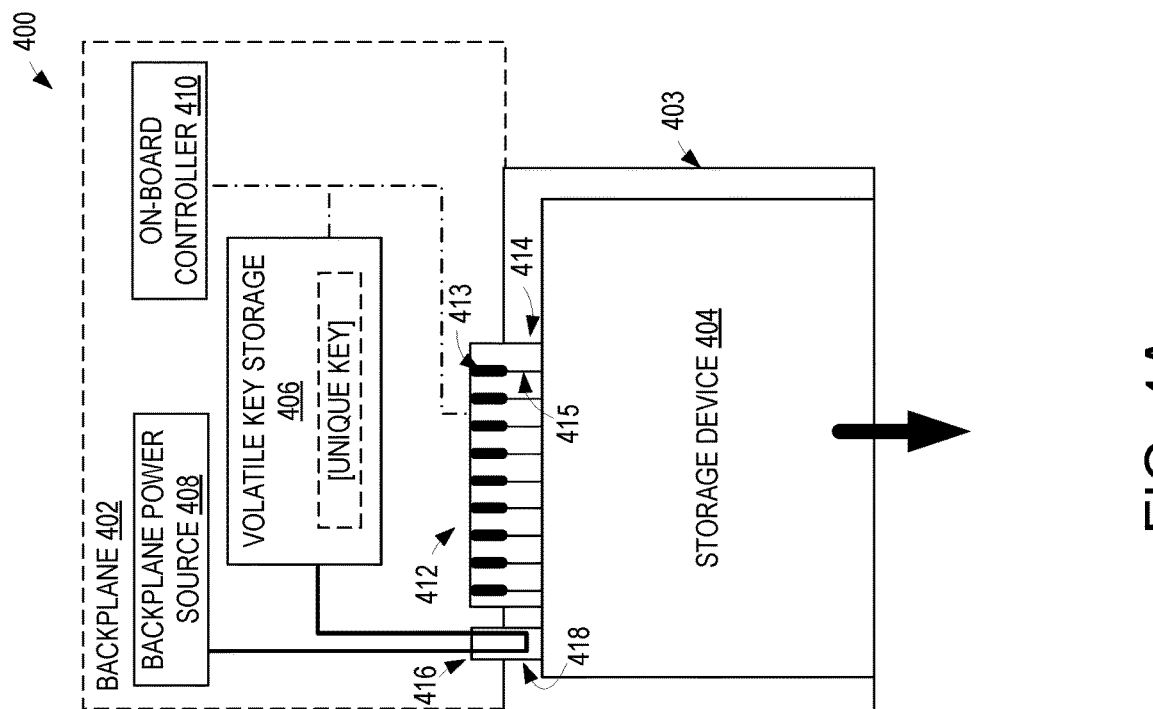
FIG. 4A

Figure 5:
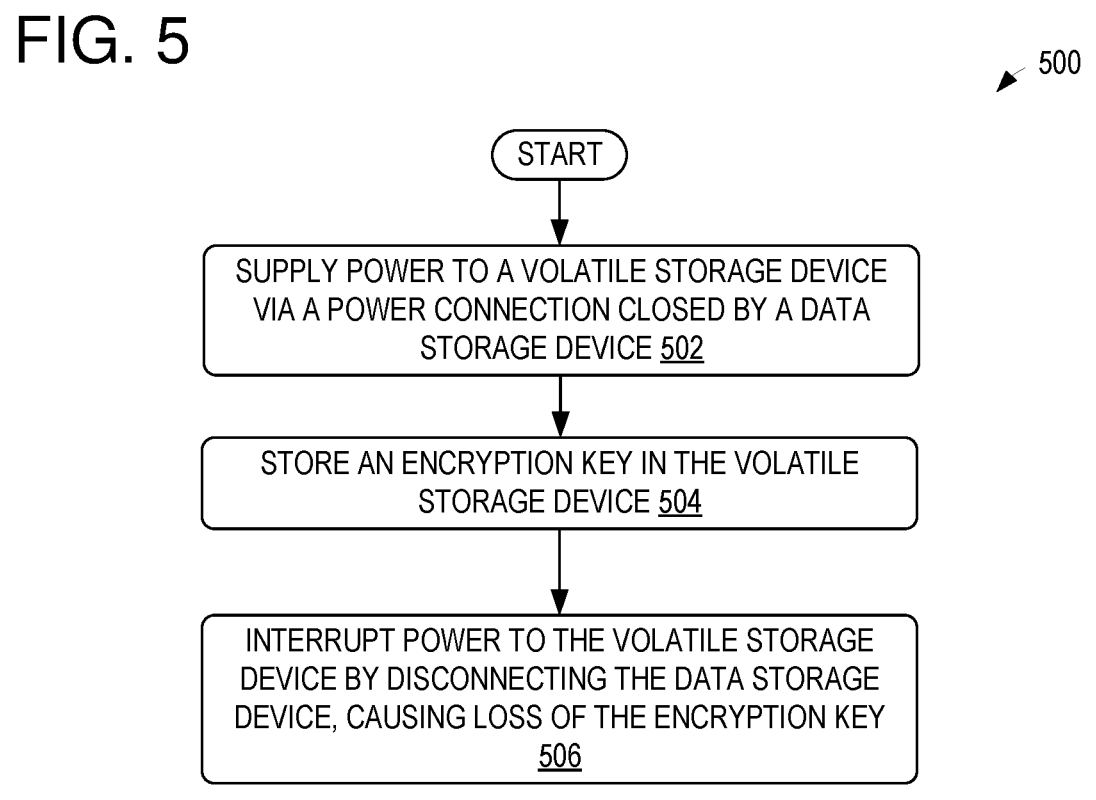

```
          ( START )
              │
              ▼
┌─────────────────────────────────────────┐
│ SUPPLY POWER TO A VOLATILE STORAGE DEVICE│
│ VIA A POWER CONNECTION CLOSED BY A DATA  │
│ STORAGE DEVICE 502                       │
└─────────────────────────────────────────┘
              │
              ▼
┌─────────────────────────────────────────┐
│ STORE AN ENCRYPTION KEY IN THE VOLATILE  │
│ STORAGE DEVICE 504                       │
└─────────────────────────────────────────┘
              │
              ▼
┌─────────────────────────────────────────┐
│ INTERRUPT POWER TO THE VOLATILE STORAGE  │
│ DEVICE BY DISCONNECTING THE DATA STORAGE │
│ DEVICE, CAUSING LOSS OF THE ENCRYPTION KEY│
│ 506                                      │
└─────────────────────────────────────────┘
```

FIG. 6

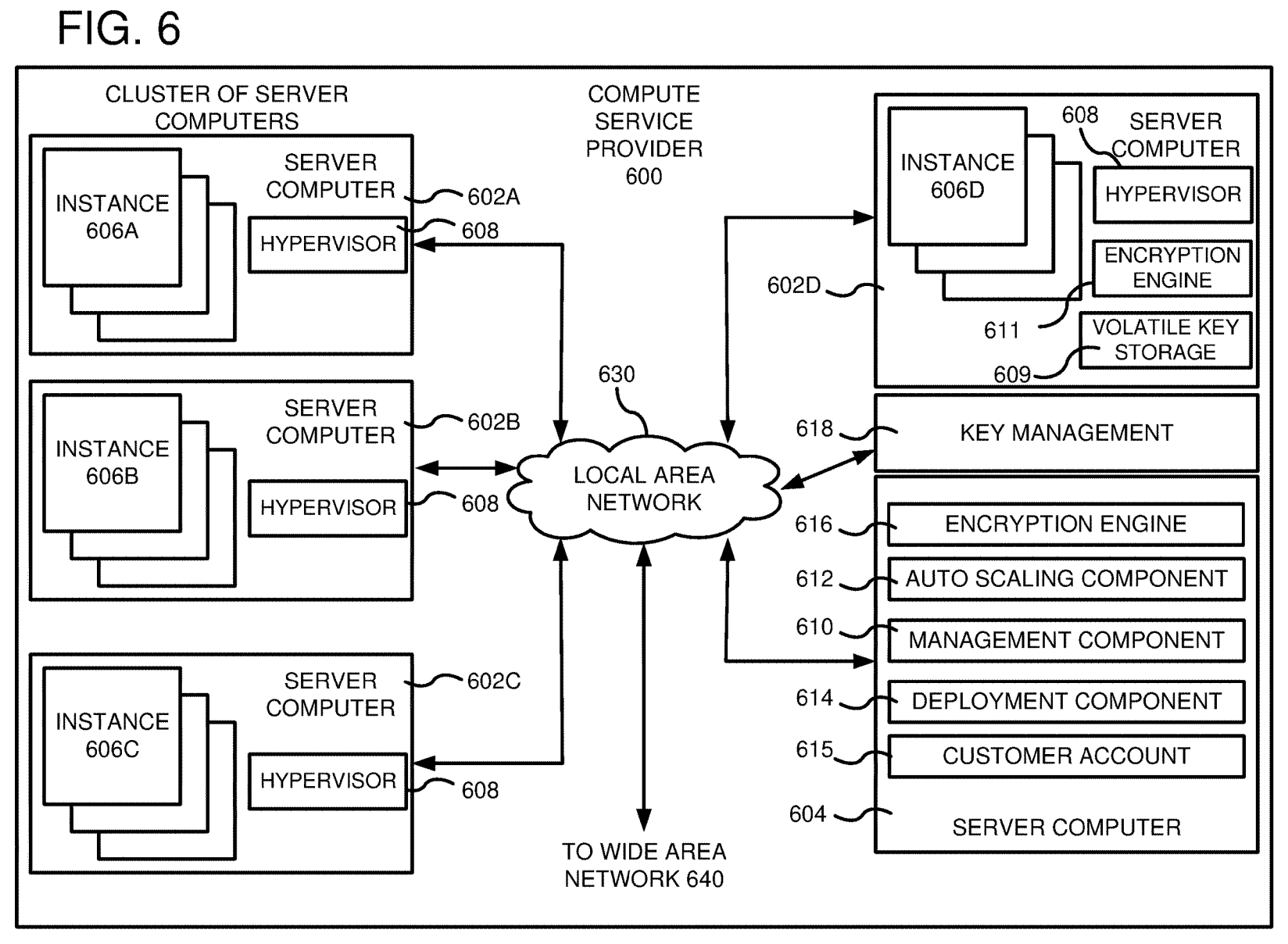

COMPUTE SERVICE PROVIDER 600

SERVER COMPUTER 608
INSTANCE 606D
HYPERVISOR
ENCRYPTION ENGINE 611
VOLATILE KEY STORAGE 609

602D

KEY MANAGEMENT 618

ENCRYPTION ENGINE 616
AUTO SCALING COMPONENT 612
MANAGEMENT COMPONENT 610
DEPLOYMENT COMPONENT 614
CUSTOMER ACCOUNT 615
SERVER COMPUTER 604

LOCAL AREA NETWORK 630

TO WIDE AREA NETWORK 640

CLUSTER OF SERVER COMPUTERS

SERVER COMPUTER 602A
HYPERVISOR 608
INSTANCE 606A

SERVER COMPUTER 602B
HYPERVISOR 608
INSTANCE 606B

SERVER COMPUTER 602C
HYPERVISOR 608
INSTANCE 606C

COMPUTING ENVIRONMENT 700

COMMUNICATION CONNECTION(S) 770

INPUT DEVICE(S) 750

OUTPUT DEVICE(S) 760

STORAGE 740

730 graphics or co-processing unit 715 central processing unit 710

MEMORY 725

MEMORY 720

SOFTWARE 780 IMPLEMENTING DESCRIBED TECHNOLOGIES

VOLATILE KEY STORAGE FOR DATA ENCRYPTION

BACKGROUND

Non-volatile data storage devices are typically employed to store data for use by computing devices. Data storage devices may be used to store a wide variety of data, such as computer executable files, documents, images, videos, and/or other data. In some examples, it may be desirable to secure access to the data on a data storage device in order to ensure that only authorized entities or computing systems are able to read and/or interpret the stored data.

BRIEF DESCRIPTION OF THE DRAWINGS

FIG. 2 is another example schematic diagram showing a plurality of storage devices using respective volatile key storage components for use in encrypting data on the storage devices.

FIG. 3 is a flow chart of an example method for using volatile key storage to secure data on storage devices.

FIGS. 4A and 4B show an example effect that removing a storage device has on a volatile key storage in an example backplane.

FIG. 5 is a flow chart of an example method for using volatile key storage in a data storage system.

FIG. 6 is an example system diagram showing a plurality of virtual machine instances running in the multi-tenant environment.

DETAILED DESCRIPTION

One approach for securing data stored on a data storage device, such as a hard disk drive, solid state drive, or other storage device, includes encrypting the data so that it can only be properly interpreted after an associated decryption process is performed on the data. The encryption/decryption may be performed by applying the data to an algorithm that uses one or more keys. Accordingly, the security of the data on the storage device in the above-described examples further depends on the control of access to the one or more keys. As used herein, the term "key" may refer to information (e.g., a string of numbers, letters, and/or other characters, or other data) that is used in or by an encryption algorithm to securely encode (e.g., encrypt) and/or securely decode (e.g., decrypt) data. The key(s) described herein may be the only key, a portion of a key, or one of a plurality of keys used in one or more encryption algorithms to encrypt/decrypt data stored on a respective storage device.

The disclosure provides storage systems, methods, and related technologies for providing security for data using volatile cryptographic key storage. In addition to other considerations, the disclosed technologies provide mechanisms that control power supplied to a volatile storage device based on connection of a storage device storing data that is encrypted using a key stored in the volatile storage device. In some examples, when the storage device is disconnected (e.g., from a backplane or other system), power to the volatile storage device is disrupted, and the cryptographic key stored therein is erased. In this way, the data on the storage device is not be able to be decrypted once the storage device is disconnected from the system providing the volatile key storage, thereby increasing security of the data on the storage device. Additional details of example volatile key storage systems are described herein.

Figure 1:
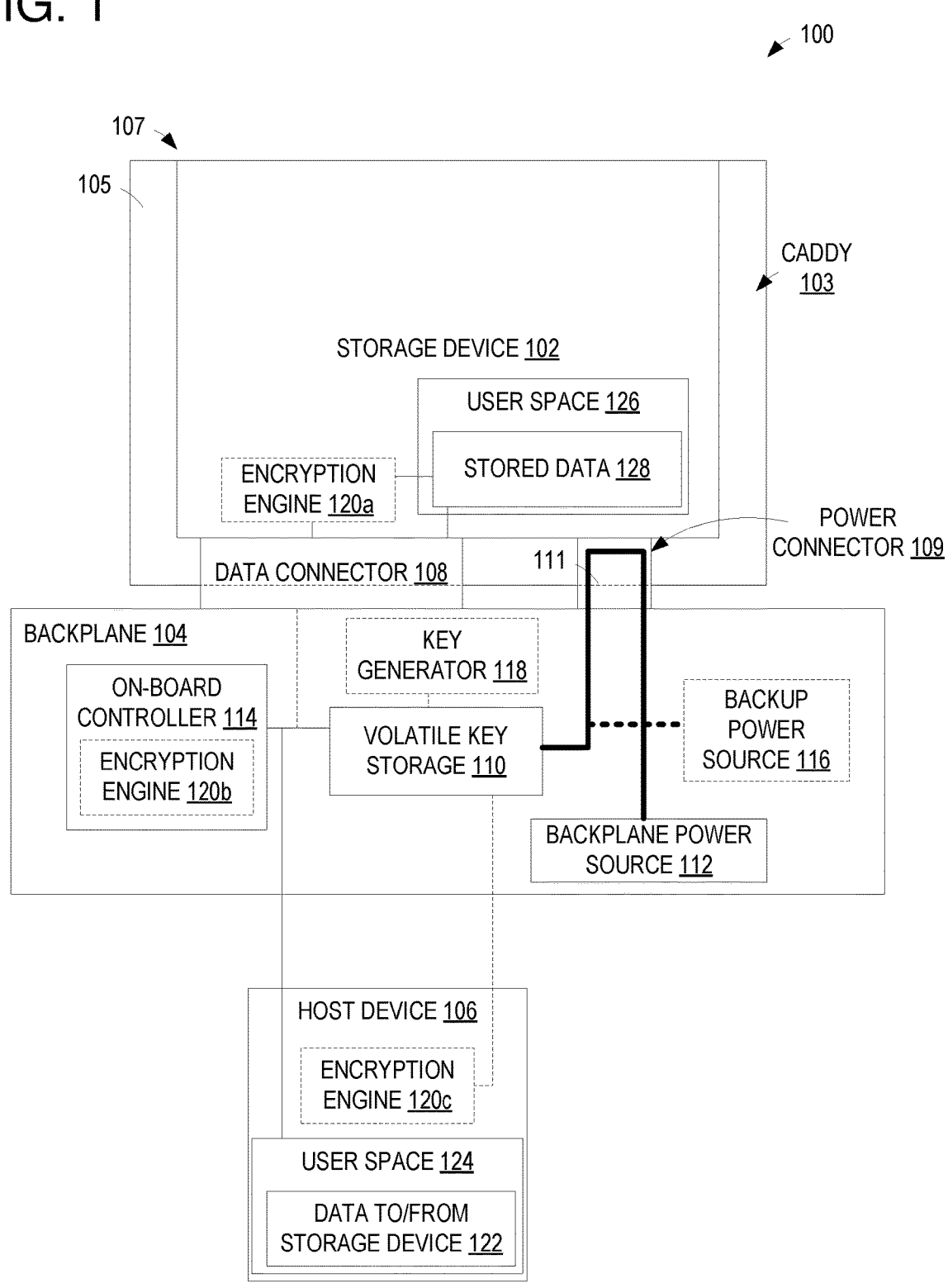
FIG. 1 is an example schematic diagram showing a storage system using a volatile key storage component for use in encrypting data on a storage device.

FIG. 1 shows an example of a computing system 100 that utilizes volatile key storage to increase security of stored data. The computing system 100 includes a storage device 102, which is illustrated as being connected to a backplane 104. The storage device 102 may be housed in or otherwise supported by a caddy 103, which enables the storage device to be connected or disconnected from the backplane. For example, the backplane may be included in a server rack, disk array, or other computing system, and the caddy 103 may be configured to fit into a bay of the computing system. The caddy 103 may include one or more supports 105 configured to hold the storage device 102, such that the storage device 102 is placed in the caddy 103, then the combined caddy/storage device unit 107 is inserted into/connected to the backplane 104. The storage device 102 (e.g., when held by the caddy 103) may serve as a removable storage resource for the computing system, and may include any non-volatile storage device, such as a hard disk drive, solid-state drive, and/or other types of storage devices.

The backplane 104 may include any suitable device and/or computing system for providing data and/or power connections for one or more storage devices. In the illustrated example, the storage device 102 is connected to the backplane 104 via data connector 108 (e.g., providing a data connection usable to transmit or transfer data between the backplane and the storage device, such as a Serial AT Attachment, SATA, connector, a Parallel AT Attachment, PATA, connector, a Small Computer System Interface, SCSI, or Serial Attached SCSI connector, Peripheral Component Interconnect, PCI, Universal Serial Bus, USB, Fire-Wire, Thunderbolt, and/or any other suitable connector) and power connector 109. It is to be understood that the data connector 108 may also provide power to the storage device 102 in some examples, and the power connector 109 is usable to control the provision of power to a volatile storage device, as described in more detail below. The backplane 104 may also connect to one or more computing devices, such as host device 106, and may be part of a server, disk array, or other computing system, as described above. In some examples, the host device 106 may read and/or write data to storage device 102 (e.g., represented as stored data 128 in user space 126 of storage device 102) via the backplane 104 by transmitting and/or receiving data via the data connector 108, where the data to be transmitted to the storage device and/or received from the storage device is stored at 122. For example, the backplane 104 includes an on-board controller 114 configured to perform operations using the backplane, such as transferring (e.g., transmitting/receiving) data between the data storage device 102 and the host device 106 and/or controlling other operations, such as the transfer of a key from volatile storage, as described in more detail below. In some examples, the data may be stored at 122 temporarily (e.g., component 122 may include a data buffer), as the host device 106 may further serve as an interface to a server or other computing system associated with backplane 104 that is accessed by a client device, which may be the originator and/or destination for the data transmitted to/received from the storage device 102.

Data in the storage device 102 may be encrypted in order to prevent unauthorized entities from accessing and interpreting the data. Any suitable encryption mechanism may be performed in order to transform (e.g., encode) data on the storage device into content (e.g., ciphertext) that is unintelligible unless decrypted. For example, the encryption mechanism may include symmetric key, asymmetric key, public/private key, and/or other types of cryptographic systems to encrypt and decrypt data. As suggested by the example types of encryption mechanisms provided above, the encryption may utilize one or more keys to perform encryption and/or decryption of the data. For example, during encryption, the key(s) may be applied to one or more encryption algorithms, alongside the unencrypted data, in order to generate corresponding encrypted data, which is stored in the storage device 102. In order to decrypt the data, one or more keys (which may include at least one of the same keys used in the encrypting process, or which may involve completely different key(s)) are applied to one or more decryption algorithms, alongside the encrypted data, in order to generate corresponding decrypted data (e.g., the original data, prior to encryption). In still other examples, a key may be used indirectly with the encryption and/or decryption algorithm(s); for example, to generate a further key or other information used in the algorithm(s). As shown in FIG. 1, encryption and/or decryption may be performed by an encryption engine, which may be located in one or more locations of the system, such the storage device 102 (e.g., encryption engine 120*a*), the backplane 104 (e.g., encryption engine 120*b* of on-board controller 114), and/or the host device 106 (e.g., encryption engine 120*c*).

Any one or more of the above-described keys may be stored in a volatile key storage 110 of the backplane 104 after generation via key generator 118. Although shown in backplane 104, it is to be understood that key generator 118 may be located in other locations, such as the storage device 102, the host device 106, and/or a remote device. In some examples, the key generator 118 may be configured to generate the key (e.g., an encryption key) for storage in volatile key storage 110 responsive to detecting the connection of the storage device 102 to power connector 109. In other examples, the key generator 118 may be configured to generate the key based on a request from a user or administrator/management entity for the backplane. The key generator 118 may be configured to generate the key using any suitable key generation algorithm or mechanism, in some examples using information from one or more data sources in the backplane 104, on the storage device 102, in the host device 106, and/or in another location. In this way, the key may be generated based on information from one or more data sources. For example, the key generator 118 may be configured to generate the key using information from the key generator 118 (e.g., information from within storage included in the key generator 118 or information generated by an algorithm or other mechanism of the key generator 118), the storage device 102, and the host device 106, and/or any other number or combination of information sources. As a more detailed illustrative example, the information from the storage device 102 may include a serial number or other identifier for the storage device, the information from the host device 106 may include secret data corresponding to the host device, and the information from the key generator 118 may include a random number generated by the key generator. Each of these pieces of information may be combined in the key generator 118 according to a key generation algorithm to generate a unique key (e.g., unique to the three elements that provide the secret/information used to generate the key) that corresponds to the storage device 102 and the host device 106.

The volatile key storage 110 may include volatile memory, such as random-access memory (RAM), that is only able to store data as long as the memory is provided with power. Accordingly, data in the volatile key storage 110 is erased once power to the volatile key storage is lost or interrupted, effectively crypto-shredding (e.g., cryptographically erasing) the storage device 102 (e.g., as the data on the storage device may not be recoverable without the key). The volatile key storage 110 may primarily receive power via a backplane power source 112, which may correspond to a battery and/or power grid-supplied source and/or related components (e.g., inverters, voltage dividers, capacitors, etc.) used to power components of the backplane 104 (and optionally other components connected to the backplane, such as the storage device 102).

As shown, the power connection between the volatile key storage 110 and the backplane power source 112 traverses through a power connector 109 in the caddy 103 of the storage device 102. The power connector 109 may be configured to connect to a corresponding power connector on the backplane (e.g., the portion under the dashed line 111 in the illustrated figure) in order to complete or close the power connection between the volatile key storage 110 and the backplane power source 112. Accordingly, as shown and described in more detail below with respect to FIG. 2, when the storage device 102 (and associated caddy 103) is disconnected from the backplane 104, the power connection between the volatile key storage 110 and the backplane power source 112 is opened, causing an interruption of the flow of current therebetween. It is to be understood that in some examples, the power connector 109 may be located in a different area of the caddy 103 and/or the data storage device 102, or may form a portion of the data connector 108. For example, in cases where the power connector 109 is integrated into the data connector 108, one or more pins of the backplane side of the data connector 108 (e.g., the portion of 108 below the dashed line) may form an open circuit connection between the volatile key storage 110 and the backplane power source 112. Corresponding pin(s) of the caddy-side of the data connector 108 (e.g., the portion of 108 above the dashed line) may be configured to complete or close the circuit connection between the volatile key storage and the backplane power source when connected to the backplane-side pins.

In examples where the backplane power source is the only source of power to the volatile key storage 110, the disruption of current flow results in an erasure of the data stored in the volatile key storage (e.g., an erasure of the unique key for encrypting/decrypting data on the storage device 102) substantially immediately upon disconnection of the storage device 102/caddy 103 from the backplane 104. Without this key, the data on the storage device 102 may be considered to be cryptographically erased (e.g., "crypto-erased" or "crypto-shredded"), as the data may be indecipherable without the unique key in examples where the unique key is at least partially based on randomly-generated data and/or otherwise unrecoverable. In some examples, a new key may be generated and stored in the volatile key storage at some point after power is restored to the volatile key storage following an erasure of a prior key in the volatile key storage. For example, a new key may be generated when a new storage device is connected to a corresponding data connector/power connector of the backplane associated with the volatile key storage, as described in more detail below.

In some examples, the backplane 104 may optionally include one or more backup power sources 116 configured to provide a finite supply of power to the volatile key storage 110 in the event the connection of the volatile key storage to the backplane power source is inadvertently disconnected briefly. In this way, the volatile key storage 110 may continue to be powered (and the unique key may be maintained in the volatile key storage), while power from the backplane power source 112 is disrupted (e.g., due to a temporary power loss of the backplane, such as during a maintenance routine, unexpected power outage, power down operation for removing one or more other storage devices connected to the backplane, etc.), for a finite period of time, until the backup power source is depleted. If the power supplied from backplane power source 112 is not restored to the volatile key storage 110 (e.g., if the power supplied by the backplane power source 112 remains disrupted for the finite period of time), then the volatile key storage 110 will no longer be powered once the finite period of time has elapsed (e.g., once the backup power source is depleted of energy), and the unique key will be deleted. If the power supplied from backplane power source 112 is restored to the volatile key storage 110 within this finite period of time (e.g., before the backup power source is depleted of energy), then the unique key may be maintained as stored thereon. Although illustrated in the example of FIG. 1 as optionally being connected to the volatile key storage 110 on an opposing side of the power connector 109 from backplane power source 112 (e.g., such that the backup power source 116 may provide power to the volatile key storage 110 even if the connection in power connector 109 is not completed by the storage device), in other examples the backup power source 116 may be connected on a same side of the power connector 109 as the backplane power source 112 (e.g., as shown in the example of FIG. 2) in order to ensure that power is only provided to the volatile key storage 110 while the data storage device is present and completing the connection in the power connector 109.

In this way, in some examples, each storage device connected to a backplane may be erased (e.g., cryptographically erased) by disconnecting power from the backplane and/or the volatile key storage devices and waiting until the finite period of time has elapsed. In some examples, as shown and described with respect to FIG. 2 below, one or more switches or other mechanisms may be provided to further facilitate such a batch erasure process (e.g., to directly cut connections to the backup power supplies, which subsequently causes a batch erasure of all drives once the backplane power supply is switched off, reducing time spent waiting for the backup power supplies to drain).

The backup power source 116 may include a battery, capacitor, and/or other component configured to provide electrical energy (e.g., a threshold or finite amount of electrical energy) to be used by the volatile key storage in the event of an outage of power supplied by the backplane power source 112. The backup power source 116 may have a connection to the backplane power source 112 (e.g., separate from the connection between the volatile key storage and the backplane power source) in some examples, and may be configured to be restored to a full charge after depletion (and after the volatile key storage loses power long enough to be erased) in order to provide backup power for a next instance of a connection of a storage device and associated unique key generation/storage. In other examples, the backup power source 116 may be configured for a single use, and may only be reused if recharged manually (e.g., removed from the backplane, recharged in a remote charging device, and replaced in the backplane once recharged) or may be replaced with a new backup power source after depletion. In additional or alternative examples, the on-board controller 114 and/or another monitoring component may receive a signal from the backup power source 116 indicating a charge level, which may be used to alert a user of the host device 106 (or other user connecting to the backplane) of the charge level and/or a recommendation to recharge the backup power source.

In the above examples, the maintenance of a unique key in volatile key storage 110 is based on the connection of the storage device 102. In this way, the unique key is only able to be retrieved to perform decryption of the data stored on storage device 102 as long as the volatile key storage 110 is powered. Once the storage device 102 is removed (immediately thereafter, or following a brief delay corresponding to an amount of time the backup power source is able to continue to power the volatile key storage in examples where such backup power is used), the data on the storage device is considered to be cryptographically erased, as the data is unintelligible unless decrypted using the unique key. Furthermore, to maintain security of the key stored in the volatile key storage, the volatile key storage may only be accessible to selected components of the system, such as the key generator 118 (which may be a uni-directional or write-only connection in some examples, allowing for the key generated by the key generator to be communicated to the volatile key storage and not allowing the key generator to read data from the volatile key storage) and may generally not be accessible by external systems. In order to provide or send the stored key to an encryption engine executing in an external device (e.g., encryption engine 120a or 120c), the volatile key storage 110 and encryption engines may communicate in accordance with a secure key exchange protocol (e.g., the encryption engine on the storage device, backplane, host device, etc. may request the key, which is then sent in accordance with the secure key exchange protocol using the on-board controller of the backplane and/or a key management system), and the communication may not allow access to the volatile key storage from outside the encryption engine (e.g., a user space 124 of the host device 106 and/or user space 126 of the storage device may not be allowed to access the volatile key storage 110). In other examples, the key in volatile key storage 110 may be accessible by a storage device (e.g., in the host device 106, storage device 102, and/or other system connected to the backplane) configured to maintain a copy of the key for backup purposes.

The above examples provide a mechanical solution to controlling the provision of power to the volatile key storage, whereby the act of physically removing the storage device triggers the loss of power automatically by way of breaking a physical connection. In such examples, a storage device may be cryptographically erased without involving a software-based command to perform the erasure, which may protect against scenarios in which software-based commands are unable to be sent between components of the system. In additional or alternative examples, a cryptographic erasure may be achieved using one or more sensors, such as magnetic sensors, optical sensors, etc., configured to detect the presence of the storage device. In such examples, the flow of current from the backplane power source 112 may be controlled by a switch or other controller that receives a signal from the one or more sensors (or an intermediate processing device configured to interpret the signal(s) from the sensors(s)), where the switch or controller is configured to interrupt the flow of current between the backplane power source 112 and the volatile key storage 110 when the signal(s) indicate that the storage device is no longer connected to the backplane 104. In this way, the maintenance of the unique key in the volatile key storage 110 may still be controlled based on the presence of the storage device, through a sensor-based solution. In some examples, the sensor-based solution may be used in combination with the mechanical solution described above in order to provide a backup mechanism for cryptographically erasing a storage device when the storage device is removed from the backplane.

FIG. 2 is a schematic diagram of another example computing system 200 for securing data on storage devices using volatile encryption key storage. FIG. 2 shows an example of a backplane 202 that provides connections (and associated volatile key storage) for multiple storage devices (e.g., storage device 204a and 204c are shown as being connected to respective data connectors 205a and 205c and power connectors 207a and 207c, while a middle data connector 205b and power connector 207b for a storage device is shown as being in a disconnected state with no storage device present). An on-board controller 210 is shown as being connected to each of the data connectors 205a-205c and volatile key storage 206a-206c. The on-board controller 210 may perform one or more of the operations described above with respect to on-board controller 114 of FIG. 1. It is to be understood that the system 200 of FIG. 2 is shown in a simplified form to illustrate an example of multiple data storage device connections. The components shown therein may include additional or alternative features; for example, the backplane 202 may include one or more of the components illustrated for backplane 104 of FIG. 1. For example, an encryption engine and/or key generator may be present on the backplane and/or the data storage device(s) of FIG. 2 to perform operations as described with respect to encryption engines 120a-c and key generator 118 of FIG. 1. It is to be further understood that the number of data storage devices (and associated power connectors, data connectors, and volatile key storage components) shown in FIG. 2 is exemplary, and different arrangements and/or quantities of data storage devices (and associated components) may be included in a backplane without departing from the scope of this disclosure.

As shown, each storage device power connector is associated with a different respective volatile key storage (e.g., storage device power connector 207a is associated with volatile key storage 206a, storage device power connector 207b is associated with volatile key storage 206b, and storage device power connector 207c is associated with volatile key storage 206c). Each volatile key storage receives power from a backplane power source 208 via a respective power connection that is only closed when a storage device is connected to its storage device power connector. In the illustrated example, volatile key storages 206a and 206c are receiving power from the backplane power source 208, as the respective storage devices 204a and 204c are connected to respective power connectors 207a and 207c, closing the associated connection loops. In contrast, volatile key storage 206b is not powered, as the connection in power connector 207b is open due to the absence of a corresponding data storage device.

In this way, provision of power to each volatile key storage is controlled by a connection of a respective storage device. As each volatile key storage may include a different unique key (e.g., a key corresponding to a connected storage device), the illustrated configuration enables data security to be controlled on a per-storage device basis. For example, removing storage device 204c would cause a disconnection of power to volatile key storage 206c, effectively crypto-erasing storage device 204c (due to the loss of the unique key stored in the volatile key storage 206c, as described above). Meanwhile, the data of storage device 204a would remain readable using the unique key stored in volatile key storage 206a, which would be unaffected by the removal of storage device 204c.

As described above with respect to FIG. 1, in some examples, the backplane may include a backup power source 212 configured to supply power to the volatile key storage devices 206a-206c in the event of a temporary power loss from backplane power source 208. The backup power source 212 may be associated with a backup power source disconnect switch 214, which controls a flow of current between the backup power source 212 and the backplane power source 208 and/or the volatile key storage devices 206a-206c. It is to be understood that the backup power source 212 may be connected to the backplane power source 208 to receive current to charge up the backup power source, and may additionally be connected to the conductive wire along which energy from the backplane power source is propagated toward the volatile key storage devices 206a-206c. The backup power source disconnect switch 214 may include controls for selectively opening or closing one or both of the connections (or for a single connection that provides energy flow in both directions) of the backup power source 212 (e.g., a connection to the power line connected between backplane power source 208 and the power connectors 207a to provide power to the volatile key storages in the event of power loss at the backplane power source 208, and a connection between the backplane power source and the backplane power source to charge the backup power source). The backup power source disconnect switch may be connected to a physical switch on the backplane or software switch controlled via commands received from a controller, such as the on-board controller 210 or other device. In this way, as described above, the backup power source disconnect switch 214 may enable the backplane to cryptographically erase all storage devices at once, responsive to shutting off power of the backplane (e.g., disabling backplane power source 208), without having to wait for the backup power source 212 to drain. In some examples, the switch 214 may be protected to prevent unauthorized cryptographic erasure of all storage devices connected to the backplane. For example, the switch may include a physical key-based switch that only allows the switch to be accessed and/or actuated when the physical key is used to unlock the switch.

In the illustrated example, the backup power source 212 is connected upstream of the power connectors 207a-207c associated with the different volatile key storage devices 206a-206c in order to ensure that the volatile key storage devices are only powered as long as the respective power connection is closed. For example, in the illustrated example, if backplane power source 208 is disrupted, the backup power source 212 may power volatile key storage 206a and 206c for a finite period of time (e.g., until the backup power source 212 is drained), while volatile key storage 206b would not be powered by the backup power source 212 due to the open circuit in power connector 207b (e.g., the lack of presence of a storage device to complete the circuit). In other examples, the backup power source may be connected to each volatile key storage device 206a-206c individually and/or different respective backup power sources may be respectively associated with each volatile key storage device 206a-206c and connected downstream of the power connectors 207a-207c, respectively.

FIG. 3 is a flow chart of an example method 300 for using volatile key storage to secure data on a removable storage device. For example, method 300 may be performed using one or more components of the system 100 of FIG. 1, system 200 of FIG. 2, and/or system 400 of FIGS. 4A/4B (described in more detail below) in order to provide a way to automatically cryptographically erase a storage device responsive to removing the storage device from an associated backplane or other connected device. At 302, the method optionally includes detecting a connection of a storage device to a backplane. For example, a sensor, such as a proximity sensor (e.g., a magnetic, optical, and/or other sensor configured to determine when a storage device has been connected to a backplane) may provide a signal (e.g., directly or indirectly) to a processing component (e.g., an encryption key generator, such as key generator 118 of FIG. 1) responsive to detecting that a storage device has been connected to a backplane.

At 304, the method includes generating (e.g., using a key generator such as key generator 118 of FIG. 1) a unique key corresponding to the storage device (e.g., the storage device optionally detected at 302 and/or a storage device using a connector associated with a selected volatile key storage component) for use in an encryption (and/or decryption) of data stored on the storage device. For example, the unique key may be used in an encryption algorithm to encrypt data on the storage device and/or by a decryption algorithm to decrypt data on the storage device. As described above with respect to FIG. 1, the key may be generated according to an associated key generation algorithm or mechanism, which may include combining information from multiple sources to generate the key.

At 306, the method includes storing the unique key in a volatile memory of the backplane, where the volatile memory is powered while the storage device is connected to the backplane. For example, as shown in FIGS. 1 and 2, the volatile memory may be connected to a backplane power source via an electrical connection that becomes an open circuit (disrupting the provision of power to the volatile memory) when a storage device is removed.

At 308, the method includes reading and/or writing data to/from the storage device, where the data is encrypted and/or decrypted using the unique key while the storage device is connected to the backplane. For example, an encryption engine, such as encryption engine 120a, 120b, and/or 120c of FIG. 1, may retrieve the key (e.g., directly or indirectly) from the corresponding volatile key storage device (e.g., the volatile key storage device receiving power via a power connector that is closed due to connection of the storage device to the backplane, as shown in FIGS. 1 and 2). As indicated at 310, the data is crypto-erased responsive to removal of the storage device from the backplane due to disconnection of power supplied to the volatile memory. In some examples, where the power supply connected through the storage device (e.g., a caddy in which the storage device is housed), the crypto-erasure may occur immediately upon disconnection of the drive, as the volatile memory stops receiving power and the unique key is lost. In other examples, where the volatile memory is connected to a backup power source, the crypto-erasure may occur after a short delay corresponding to a time that the backup power source is able to continue powering the volatile memory. As in the prior example, once the volatile memory loses power (e.g., from any backup power source), the unique key will be lost, meaning that the data on the storage device can no longer be decrypted (e.g., the storage device is crypto-erased).

FIGS. 4A and 4B schematically show an example effect that removing a storage device may have on a volatile key storage device of a backplane of a data storage system 400. It is to be understood that additional components may be included in the data storage system 400, such as component (s) of the systems 100 and 200 of FIGS. 1 and 2, without departing from the scope of the disclosure.

The data storage system 400 includes a backplane 402 that provides data and power connections for one or more storage devices, such as storage device 404. The backplane 402 further includes a volatile key storage device 406, configured to be powered by a backplane power source 408 while the storage device 404 is connected (described in more detail below). The volatile key storage device 406 may further be connected to an on-board controller 410 to control the transmission of data from the volatile key storage device 406 (e.g., a unique key usable for encrypting and/or decrypting data in the storage device 404) to another component, such as an encryption engine in the backplane, the storage device, and/or a host device (not shown in FIGS. 4A and 4B, though optionally connected to the backplane as described above with respect to FIG. 1). Operations and/or configurations of the components of backplane 402 and storage device 404 may include one or more of the example operations/configurations described above for backplanes 104 and 202 of FIGS. 1 and 2, and storage devices 102 and 204a/ 204c of FIGS. 1 and 2, respectively.

As shown in FIGS. 4A and 4B, the backplane 402 includes a backplane-side data connector 412, comprising a plurality of pins 413. The pins 413 may be configured to mate with corresponding pins 415 of a storage device-side data connector 414 of storage device 404 and/or a caddy 403 housing/supporting storage device 404. For example, the storage device-side data connector 414 may be integrated in the caddy and may provide an intermediate connector or an extension of a corresponding connector integrated with the storage device 404. In other examples, the storage device-side data connector 414 may be comprise a void in the caddy that allows a data connector integrated with the storage device to pass through while the storage device is supported by the caddy. In some examples, the storage device 404 may be housed and/or supported by the caddy at least in part via a connection of the storage device-side data connector 414 to a corresponding integrated connector of the storage device 404. As shown, the on-board controller 410 may be connected to the backplane-side data connector 412, thereby connecting the on-board controller 410 to the storage device 404 while the storage device-side data connector 414 is connected to the backplane-side data connector 412.

The backplane 402 further includes a backplane-side power connector 416, including a portion of a power connection between the backplane power source 408 and the volatile key storage 406. As shown in the state of the system at FIG. 4A, while the storage device 404 is connected to the backplane, a storage device-side power connector 418 is configured to mate with the backplane-side power connector 416 to complete the power connection between the backplane power source 408 and the volatile key storage 406, allowing current to flow therebetween to power the volatile key storage 406 as long as the storage device 404 is connected via the power connectors 416/418. The storage device-side power connector 418 may be incorporated into the caddy 103 and/or the storage device 404. For example, the storage device-side power connector 418 may include a power connector configured to mate with the backplane-side power connector 416 that is included in the caddy 103. In other examples, the storage device-side power connector 418 may be integrated with the storage device 404 (e.g., where the caddy 103 includes a void configured to allow the connector integrated with the storage device to pass through to mate with the backplane-side power connector 416). Although shown as being spaced from the data connectors in the illustrated example of FIGS. 4A and 4B, in other examples, as described above, the power connector may be integrated with the data connector.

In some examples, one or both of the storage device-side power connector 418 and the backplane-side power connector 416 may be tamper-proof connectors, configured to protect from unauthorized interference with the connectors. For example, one or both of the power connectors may include a non-conductive element configured to block ends of conductors in the connectors while the storage device 404 is disconnected or otherwise be configured to restrict access to the conductors to prevent the circuit at 416 from being closed while a storage device is disconnected from a corresponding bay of the backplane. For additional protection, conductive elements configured to carry electrical energy from backplane power source 408 to volatile key storage 406 may also be protected from unauthorized access (e.g., buried in layers of a circuit board, where the volatile key storage may be coated with a material to prevent access to connection endpoints corresponding to a path of power supply to the volatile key storage).

As shown in FIG. 4A, the volatile key storage 406 may store a unique key (as described in more detail above with respect to FIGS. 1-3) while powered, the unique key being configured for use in encrypting/decrypting data from the storage device 404. As shown in FIG. 4B, once the storage device 404 is disconnected from the backplane (e.g., the power connectors 416 and 418 are no longer connected), power to the volatile key storage 406 is interrupted (e.g., the volatile key storage is no longer powered), and the unique key is no longer maintained in the volatile key storage (e.g., as represented by the "null" value replacement for illustrative purposes). In this way, the data on the storage device 404 is protected, as the key usable to decrypt the data into meaningful information no longer exists once the storage device 404 is disconnected form the backplane.

FIG. 5 is a flow chart of an example method 500 for utilizing volatile key storage to secure data in a data storage system. For example, method 500 may be performed using one or more components of the system 100 of FIG. 1, system 200 of FIG. 2, and/or system 400 of FIGS. 4A/4B in order to provide a way to automatically cryptographically erase a storage device responsive to removing the storage device from an associated backplane or other connected device. At 504, the method includes supplying power to a volatile storage device via a power connection closed by a data storage device. The volatile storage device may be any suitable storage device that is configured to only maintain storage of data as long as power is supplied to the volatile storage device.

At 504, the method includes storing an encryption key in the volatile storage device. For example, as described above in the prior examples of FIGS. 1-4B, the encryption key may be any suitable key used to encrypt and/or decrypt data on a storage device. As noted at 502, the encryption key may only be maintained in the volatile storage device as long as the volatile storage device is powered (e.g., via the power connection that is closed by the data storage device).

At 506, the method includes interrupting power to the volatile storage device by disconnecting the data storage device, causing a loss of the encryption key. For example, as described with respect to FIGS. 4A and 4B above, the data storage device may include a power connector that is configured to close a circuit for delivering power to the volatile storage device. Upon disconnection of the data storage device, the circuit is broken, causing power to the volatile storage device to be disrupted and subsequent loss of the encryption key.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

In some implementations of the disclosed technology, the computer service provider 600 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/ or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated).

The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. For example, the server computers 602A-602D may include storage devices configured to store data (e.g., including instructions for executing software instances 606A-606D and/or data usable by instances 606A-606D in some examples). In one embodiment, the instances 606A-606D are virtual machines. As known in the art, a virtual machine is an instance of a software implementation of a machine (i.e., a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more of the server computers in the compute service provider may include at least some of the components of systems 100 and 200 of FIGS. 1 and 2 and/or corresponding components of FIGS. 4A and 4B. For example, one or more of the servers may include a backplane, such as backplane 104 of FIG. 1, backplane 202 of FIG. 2, and/or backplane 402 of FIGS. 4A and 4B configured to provide data and power connectors to storage devices (e.g., storing data for use in the compute service provider as described above). As shown in server computer 602D for illustrative purposes (and understood to be optionally present in any of the servers/server computers of FIG. 6), the server computer(s) may include an encryption engine 611/616, for encrypting and/or decrypting data on the storage devices, and a volatile key storage device 609 for storing a unique key usable by the encryption engine 611 to perform the above-described encryption/decryption. The encryption engine 611/616 may be an example of encryption engine 120a, 120b, or 120c of FIG. 1, and the volatile key storage 609 may be an example of volatile key storage 110 of FIG. 1, volatile key storage 406 of FIG. 4, and/or any of volatile key storage 206a-206c of FIG. 2. The volatile key storage 609 may be electrically coupled to backplane power for the server computer via a power connection that is only closed while a corresponding storage device is connected to the backplane, as described in the examples of FIGS. 1-4B above. In some examples, a key management service 618 may be configured to retrieve a key from a key generator (e.g., key generator 118 of FIG. 1) and distribute it, according to a secure key communication protocol, to the volatile key storage 609 and/or the encryption engine 616.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multitenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end customers can access the compute service provider 600. It should be appreciated that the network topology illustrated in FIG. 6 has been simplified and that many more networks and networking devices can be utilized to interconnect the various computing systems disclosed herein.

Figure 7:
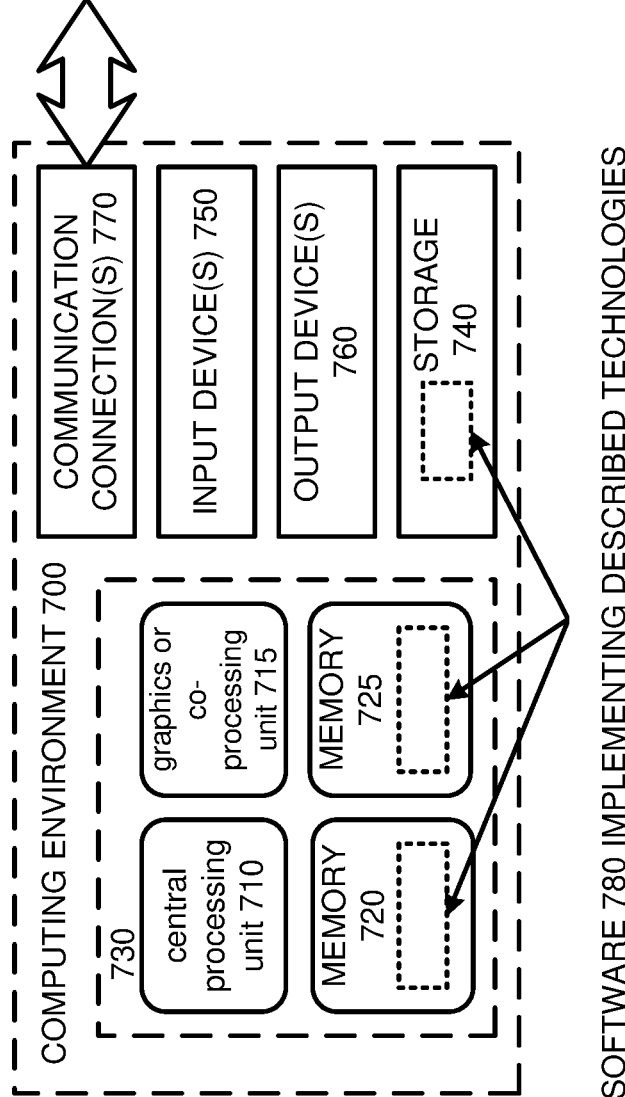
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.). In some examples, one or more components of the computing environment may be included in the backplane 104 of FIG. 1, backplane 202 of FIG. 2, and/or backplane 402 of FIG. 4, and/or the host device 106 of FIG. 1. In additional or alternative examples, one or more components of FIGS. 1, 2, 4A, and 4B may be examples of components of the computing environment 700, as described below.

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). For example, one or more of the memory 720, 725 may include the volatile key storage 110 of FIG. 1, volatile key storage 206a-c of FIG. 2, and/or volatile key storage 406 of FIGS. 4A and 4B, and may be configured to store a unique key usable to encrypt or decrypt data while a corresponding storage device storing the data is connected to the computing environment (e.g., to a backplane, as described with respect to FIGS. 1, 2, and 4A/4B)). In additional or alternative examples, one or more of the memory 720, 725 stores software 780 implementing one or more innovations described herein, in the form of computer-executable instructions suitable for execution by the processing unit(s). For example, one or more of the memory 720, 725 may store instructions for performing encryption and/or decryption of data stored on a storage device using the unique key stored in the volatile key storage.

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. For example, the storage 740 may include one or more storage devices, such as storage device 102 of FIG. 1, storage devices 204a/204b of FIG. 2, and/or storage device 404 of FIGS. 4A and 4B. In some examples, the storage 740 stores instructions for the software 780 implementing one or more innovations described herein. The data stored on storage 740 may be encrypted and/or decrypted using a unique key stored in memory 720, 725, as described above, and the unique key may only be maintained in the memory as long as the storage 740 is connected to the computing environment, as described above with respect to FIGS. 1, 2, and 4A/4B.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware.

Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computing system comprising:
a backplane comprising:
    a backplane power source;
    a first data connector configured for a data storage device,
    an on-board controller configured to control data transfer between a host device and the data storage device, and
    a volatile key storage device associated with the first data connector and configured to store a respective encryption key for data stored on the data storage device connected to the first data connector;
the data storage device; and
a caddy for supporting the data storage device, the caddy comprising a second data connector configured to couple to the first data connector of the backplane and a power connector configured to close a power connection from the backplane power source to the volatile key storage device while the data storage device is connected to the backplane, wherein the power connection between the volatile key storage device and the backplane power source traverses through the power connector in the caddy, and wherein the power connection from the backplane power source to the volatile key storage device is broken when the data storage device is disconnected from the backplane to cryptographically erase the data storage device.

2. The computing system of claim 1, wherein the backplane further comprises a backup power source coupled to the volatile key storage device, wherein the backup power source is configured to power the volatile key storage device for a finite period of time after a disruption of power supplied by the backplane power source, and wherein the respective encryption key stored in the volatile key storage device is lost and the data storage device is cryptographically erased once the finite period of time has elapsed while the disruption of power is maintained.

3. The computing system of claim 1, wherein the backplane further comprises a key generator configured to generate the respective encryption key for the volatile key storage device based on information from one or more data sources.

4. The computing system of claim 1, wherein the backplane further comprises an encryption engine comprising instructions executable by a processing component to perform one or more of encryption or decryption of data stored on the data storage device using the respective encryption key stored in the volatile key storage device.

5. The computing system of claim 1, wherein the on-board controller is further configured to send the respective encryption key of the volatile key storage device to the host device responsive to a request from the host device, and wherein the on-board controller is configured to transfer data between the data storage device and the host device to be encrypted or decrypted by the host device using the respective encryption key.

6. A caddy for supporting a data storage device, the caddy comprising:
   a support configured to hold the data storage device; and
   a storage device-side power connector configured to be coupled to a corresponding backplane-side power connector, wherein the storage device-side power connector includes an electrical connection for completing a power connection to a volatile key storage device included in the backplane when connected to the backplane, and wherein the volatile key storage device stores a key usable to encrypt or decrypt data on the data storage device while the data storage device is connected to the backplane via the caddy.

7. The caddy of claim 6, further comprising a storage device-side data connector for interfacing with a backplane-side data connector to provide a data connection between the backplane and the data storage device, wherein the data connection is used to communicate data that is encrypted or decrypted by an encryption engine using the key.

8. The caddy of claim 7, wherein the storage device-side data connector is integrated with the storage device-side power connector.

9. The caddy of claim 6, wherein the storage device-side power connector is integrated in at least a portion of the support.

10. The caddy of claim 6, wherein the power connection to the volatile key storage device comprises a connection from a backplane power source to the volatile key storage, and wherein the power connection between the volatile key storage device and the backplane power source is opened to interrupt current flow from the backplane power source to the volatile key storage device when the storage device-side power connector is disconnected from the backplane-side power connector.

11. A backplane computing system comprising:
   a data connector configured for connecting to a data storage device;

an on-board controller configured to control data transfer between a host device and the data storage device;
   a backplane power source;
   a volatile key storage device associated with the data connector and configured to store a unique key usable to encrypt or decrypt data stored on the data storage device connected to the data connector; and
   a power connector configured to close a power connection between the volatile key storage device and the backplane power source while connected to an associated storage-side power connector of the data storage device.

12. The backplane computing system of claim 11, further comprising a key generator configured to generate the unique key and transfer the unique key into the volatile key storage device.

13. The backplane computing system of claim 12, wherein the key generator is configured to generate the unique key using information from a plurality of data sources.

14. The system of claim 12, wherein the key generator is configured to generate the unique key or transfer the unique key into the volatile key storage device responsive to detection of a connection of the data storage device to the data connector or the power connector.

15. The system of claim 11, further comprising a backup power source coupled to the volatile key storage, wherein the backup power source is configured to power the volatile key storage device for a finite period of time after disruption of a flow of power from the backplane power source to the volatile key storage device, and wherein the unique key stored in the volatile key storage device is lost once the finite period of time has elapsed while the disruption is maintained.

16. The system of claim 15, further comprising a backup power source disconnect switch configured to be actuated to close or open a connection of the backup power source to the volatile key storage.

17. The system of claim 11, wherein the data connector is a first data connector, the power connector is a first power connector, the data storage device is a first data storage device, and the volatile key storage device is a first volatile key storage device, and wherein the system further comprises a second data connector, a second volatile key storage device, and a second power connector, and wherein the second power connector is configured to close a second power connection between the second volatile key storage device and the backplane power source while connected to an associated storage-side power connector of a second data storage device.

18. The system of claim 17, wherein the unique key is a first unique key stored in the first volatile key storage device, wherein a second unique key is stored in the second volatile key storage device while the second data storage device is connected to the second power connector, and wherein the first unique key is maintained in the first volatile key storage device and the second unique key is lost from the second volatile key storage device responsive to disconnection of the second data storage device from the second power connector while the first data storage device remains connected to the first power connector.

19. The system of claim 11, further comprising an encryption engine, the encryption engine including instructions executable by the on-board controller or a processing component of the system to encrypt or decrypt data on the data storage device using the unique key stored in the volatile key storage while the data storage device is connected to the power connector.

20. The system of claim 11, wherein the host device or the data storage device comprises an encryption engine, wherein the on-board controller controls a transfer and storage of encrypted data from the host device to the data storage device and a retrieval of the unique key from the volatile key storage device to the encryption engine, and wherein the encrypted data is encrypted or decrypted by the encryption engine using the unique key retrieved from the volatile key storage device.

\* \* \* \* \*